United States Patent
Ganor

(10) Patent No.: US 10,193,359 B2
(45) Date of Patent: *Jan. 29, 2019

(54) BATTERY PACK SYSTEM

(71) Applicant: EVchip Energy Ltd., Ness-Ziona (IL)

(72) Inventor: Avraham Ganor, Shoham (IL)

(73) Assignee: EVchip Energy Ltd., Ness-Ziona (IL)

( * ) Notice: Subject to any disclaimer, the term of this patent is extended or adjusted under 35 U.S.C. 154(b) by 57 days.

This patent is subject to a terminal disclaimer.

(21) Appl. No.: 14/923,151

(22) Filed: Oct. 26, 2015

(65) Prior Publication Data

US 2016/0211680 A1 Jul. 21, 2016

Related U.S. Application Data

(63) Continuation of application No. 13/423,972, filed on Mar. 19, 2012, now Pat. No. 9,172,254.

(Continued)

(51) Int. Cl.
*H02J 7/00* (2006.01)
*B60L 11/18* (2006.01)
(Continued)

(52) U.S. Cl.
CPC .......... *H02J 7/0024* (2013.01); *B60L 11/1853* (2013.01); *B60L 11/1864* (2013.01);
(Continued)

(58) Field of Classification Search
CPC ...... H02J 7/0011; H02J 7/0016; H02J 7/0024; B60L 11/1853; B60L 11/1864;
(Continued)

(56) References Cited

U.S. PATENT DOCUMENTS 7,559,388 B2   7/2009   Severinsky et al.
7,705,560 B2   4/2010   Johnson
(Continued)

FOREIGN PATENT DOCUMENTS

DE        10055531 A1    1/2002
DE     102007060329 A1   7/2009
(Continued)

OTHER PUBLICATIONS

Official action dated Mar. 31, 2016 in corresponding European Application No. 12 711 691.1, 5 pages.
(Continued)

*Primary Examiner* — An T Luu
(74) *Attorney, Agent, or Firm* — Rothwell, Figg, Ernst & Manbeck, P.C.

(57) ABSTRACT

A source of environmental pollution is the burning of fuel by the transportation vehicles (e.g., cars, trucks). The use of electric vehicles (EVs) is perceived as an essential step towards better utilization of energy. Current EVs make use of an electric engine and a battery pack that provides energy to that engine. The technology of electric engines is well developed because of the common use of such engines in trains, submarines and industrial facilities. But, while the battery packs used in EVs have made a lot of progress in the last couple of years, these battery packs still have problems. These battery packs are expansive, heavy, and limited in the amount of energy that they can provide. This obstacle is a major factor that limits the use of EVs today in the mass market. Described herein is an improved EV battery pack system.

21 Claims, 14 Drawing Sheets

Related U.S. Application Data

(60) Provisional application No. 61/453,661, filed on Mar. 17, 2011, provisional application No. 61/504,459, filed on Jul. 5, 2011.

(51) Int. Cl.
*H01M 10/04* (2006.01)
*H01M 10/42* (2006.01)

(52) U.S. Cl.
CPC ... *H01M 10/0445* (2013.01); *H01M 10/4207* (2013.01); *H02J 7/0011* (2013.01); *B60L 2200/26* (2013.01); *H01M 10/0436* (2013.01); *H01M 2220/20* (2013.01); *Y02T 10/7005* (2013.01); *Y02T 10/7061* (2013.01); *Y10T 307/653* (2015.04)

(58) Field of Classification Search
CPC ......... H01M 10/0445; H01M 10/4207; H01M 10/0436; H01M 2220/20; B06L 2200/26; Y02T 10/7005; Y02T 10/7061; Y10T 307/653
USPC .............................................. 307/71; 320/116
See application file for complete search history.

(56) References Cited

U.S. PATENT DOCUMENTS

| | | | |
|---|---|---|---|
| 2006/0092583 A1 | 5/2006 | Alahmad et al. | |
| 2008/0054327 A1 | 3/2008 | Johnson | |
| 2010/0261043 A1 | 10/2010 | Kim et al. | |
| 2010/0261048 A1 | 10/2010 | Kim et al. | |
| 2012/0187898 A1 | 7/2012 | Nysen | 320/103 |
| 2012/0235483 A1 | 9/2012 | Rigby et al. | 307/29 |

FOREIGN PATENT DOCUMENTS

| | | | |
|---|---|---|---|
| FR | 2947112 A1 | 12/2010 |
| JP | H11234909 A | 8/1999 |
| JP | 2002291165 A | 10/2002 |
| JP | 2008148387 A | 6/2008 |
| JP | 2010172062 A | 8/2010 |
| JP | 20011050208 A | 3/2011 |
| WO | 2009/158674 A2 | 12/2009 |
| WO | 2010/002140 A2 | 1/2010 |

OTHER PUBLICATIONS

Second Official Action dated Jan. 13, 2016 in corresponding Chinese Application No. 201280023490.6, 5 pages (English translation only).

Official action dated Feb. 2, 2016 in corresponding Japanese Application No. 2013-558524, 2 pages (English translation only).

International Search Report and Written Opinion from corresponding Application No. PCT/IB2012/000529, dated Aug. 10, 2012, 12 pages.

Office Action dated May 5, 2015 in correspondng Chinese application No. 201280023490.6 (English translation only), 8 pages.

European Communication issued in application No. 12 711 691.1 dated Jul. 27, 2017, 5 pages.

Notice of Allowance and translation issued in corresponding Korean application No. 10-2013-7027460, dated Nov. 1, 2017, 4 pages.

Indian Office Action issued in corresponding Indian Application No. 7648/CHENP/2013, dated Sep. 10, 2018, (6 pages).

BATTERY PACK SYSTEM

CROSS-REFERENCE TO RELATED APPLICATIONS

This application is a continuation of Ser. No. 13/423,972, filed on Mar. 19, 2012 (now U.S. Pat. No. 9,172,254, which issued on Oct. 27, 2015), which claims the benefit of U.S. Provisional Patent Application No. 61/453,661, filed on Mar. 17, 2011 and also claims the benefit of U.S. Provisional Patent Application No. 61/504,459, filed on Jul. 5, 2011. The entirety of each of said application is incorporated by reference herein.

TECHNICAL FIELD

This disclosure relates to the field of battery pack systems. In some embodiments, it relates to electric vehicle (EV) battery pack systems and also EV power train systems.

BACKGROUND

An EV battery pack typically includes several battery modules, each comprised out of several batteries (e.g., several single cell batteries), that are packed into a hardened package. The specification of the battery pack is determined by the car manufacturer and takes into consideration the extreme needs of the engine and the expected environmental conditions. Thus the specification usually calls for extra battery modules and/or for extra material, such as electrolyte, to be added to the cells to compensate for production faults and degradation of the batteries over time. Additionally, EV battery packs have a fixed current and voltage output.

Because electric engines need high current in order to produce high torque and high voltage to produce high speed, the engine's demands from the battery pack change over time as the car goes from a state of high acceleration to a high speed state.

SUMMARY

Described herein is an improved battery pack system In one aspect, the improved battery pack system includes battery pack that includes a switching grid coupled to a controller. In some embodiments, the switching grid includes a plurality of battery modules and a wiring structure that enables the controller to change the configuration of the batteries (e.g., cells) within the battery module and/or battery pack. This switching grid is used to change the output of the battery pack to fit the engine's current needs. The improved battery pack may be configured to take into consideration the concurrent state of each battery in the battery pack and environmental condition as well as the battery history information and the manufacturer recommendations.

In one particular aspect, a switcher chip for use in interconnecting a set of cells is provided. In some embodiments, the switcher chip includes: a main negative terminal; a cascading negative terminal; a main positive terminal; a cascading positive terminal; a plurality of cell terminals; and a plurality of switches.

The switcher chip may be configured such that: (a) when a set of cells are connected to the switcher chip via the plurality of cell terminals and a first subset of the plurality of switches are closed and the remainder of the switches are open, the set of cells are connected in parallel with each other and current is able to flow out the main positive terminal but is not able to flow out the cascading positive terminal, (b) when a set of cells are connected to the switcher chip via the plurality of cell terminals and a second subset of the plurality of switches are closed and the remainder of the switches are open, the set of cells are connected in series with each other and current is able to flow out the main positive terminal but is not able to flow out the cascading positive terminal, (c) when a set of cells are connected to the switcher chip via the plurality of cell terminals and a third subset of the plurality of switches are closed and the remainder of the switches are open, at least two of the cells in the set of cells are connected in series with each other and current is able to flow out the cascading positive terminal but is not able to flow out the main positive terminal, (d) when a set of cells are connected to the switcher chip via the plurality of cell terminals and a fourth subset of the plurality of switches are closed and the remainder of the switches are open, a subset set of cells are connected in parallel with each other, at least one cell is electrically disconnected from each of the other cells, and current is able to flow out the main positive terminal but is not able to flow out the cascading positive terminal, and (e) when a set of cells are connected to the switcher chip via the plurality of cell terminals and a fifth subset of the plurality of switches are closed and the remainder of the switches are open, a subset set of cells are connected in series with each other and at least one cell from the set is electrically disconnected from each of the other cells of the set.

In some embodiments, switcher chip further includes a communication circuit comprising a transmitter and receiver, wherein the receiver is communicatively connected to either a controller or a transmitter of an adjacent switcher chip such that the receiver is operable to receive switching commands transmitted from either the controller or the transmitter of the adjacent switcher chip.

In some embodiments, the switcher further includes a command decoder configured to error check commands received by the communication circuit from the controller or from another switcher chip and configured to block erroneous commands.

In some embodiments, the switcher further includes switching control logic connected to the command decoder and configured to convert commands received by the communication circuit from the controller into switch on-off commands for switching elements within the battery module.

In some embodiments, the switcher further includes a safety switching sequencer configured to receive the on-off commands from the switching control logic and configured to turn on or off at exact sequence and time one or more of the switches based on the received on-off commands.

In some embodiments, the switcher further includes a slave input terminal; a master output terminal; a slave communication module block; a master communication module block; a command decoder block; a switching control logic block; and a safety switching sequencer block.

In some embodiments, the plurality of switches comprises a plurality of power metal-oxide semiconductor field effect transistors (MOSFETs).

In another aspect, a battery module is provided. In some embodiments, the battery module includes: a switcher chip comprising: a plurality of switches, a main positive terminal, a main negative terminal, a cascading positive terminal and a cascading negative terminal; and a set of cells, the set of cells comprising: (i) a first cell having a positive terminal and a negative terminal, the positive terminal being connected to a first cell terminal of the switcher chip and the negative terminal being connected to a second cell terminal of the switcher chip, and (ii) a second cell having a positive terminal and a negative terminal, the positive terminal is connected to a third cell terminal of the switcher chip and the negative terminal is connected to a fourth cell terminal of the switcher chip, wherein the switcher chip is operable to: (i) configure the switches such that (a) the cells are connected in series, (b) current is able to flow out of the switcher chip via the main positive terminal but is not able to flow out the switcher chip via the cascading positive terminal, and (c) current is able to flow into the switcher chip via the main negative terminal but is not able to flow into the switcher chip via the cascading negative terminal, (ii) configure the switches such that (a) the cells are connected in series, (b) current is able to flow out of the switcher chip via the cascading positive terminal but is not able to flow out the switcher chip via the main positive terminal, and (c) current is able to flow into the switcher chip via the cascading negative terminal but is not able to flow into the switcher chip via the main negative terminal, and (iii) configure the switches such that (a) the cells are connected in parallel, (b) current is able to flow out of the switcher chip via the main positive terminal but is not able to flow out the switcher chip via the cascading positive terminal, and (c) current is able to flow into the switcher chip via the main negative terminal but is not able to flow into the switcher chip via the cascading negative terminal.

In some embodiments, the switcher chip further comprises: a communication circuit for receiving switching commands transmitted from a controller. In some embodiments, the switcher chip further comprises: a command decoder configured to error check commands received by the communication circuit from the controller or from another switcher chip and configured to block erroneous commands. In some embodiments, the switcher chip further comprises: switching control logic connected to the command decoder and configured to convert commands received by the communication circuit from the controller into switch on-off commands for switching elements within the battery module. In some embodiments, the switcher chip further comprises: a safety switching sequencer configured to receive the on-off commands from the switching control logic and configured to turn on or off at exact sequence and time one or more of the switches based on the received on-off commands.

In some embodiments, the first cell is a micro-cell and the second cell is a micro-cell. In some embodiments, the switcher chip controls less than seventeen single cell batteries but more than three single cell batteries. In some embodiments, the switcher chip controls more than 7 single cell batteries and less than 13 single cell batteries.

In another aspect, a battery pack system is provided. In some embodiments, the battery pack system includes a battery pack that includes: a first cluster of battery modules comprising a first column of battery modules and a second column of battery modules; a first circuit for connecting the first column of battery modules in parallel with the second column of battery modules; a second circuit for connecting the first column of battery modules in series with the second column of battery modules; a second cluster of battery modules comprising a third column of battery modules and a fourth column of battery modules; a third circuit for connecting the third column of battery modules in parallel with the fourth column of battery modules; a fourth circuit for connecting the third column of battery modules in series with the fourth column of battery modules, wherein at least one of the battery modules in the first column has (i) a switch for connecting and disconnecting a main output of the battery module to the first circuit and (ii) a switch for connecting and disconnecting a cascading output of the battery module to the second circuit, at least one of the battery modules in the second column has (i) a switch for connecting and disconnecting a main output of the battery module to the first circuit and (ii) a switch for connecting and disconnecting a cascading output of the battery module to the second circuit, at least one of the battery modules in the third column has (i) a switch for connecting and disconnecting a main output of the battery module to the third circuit and (ii) a switch for connecting and disconnecting a cascading output of the battery module to the fourth circuit, and at least one of the battery modules in the fourth column has (i) a switch for connecting and disconnecting a main output of the battery module to the third circuit and (ii) a switch for connecting and disconnecting a cascading output of the battery module to the fourth circuit.

In some embodiments, the battery pack system further includes a controller for controlling the battery pack. The controller may be operable to: (a) place the battery pack in a first mode of operation in which the battery pack produces a voltage V1; and (b) place the battery pack in second mode of operation in which the battery pack produces a voltage V2, where V2>V1. V2 may be greater than or equal to (n)(3.6)V1, where n is greater than or equal to 1. In some embodiments, at least one of the battery modules comprises: a switcher chip comprising: a plurality of switches, a main positive terminal, a main negative terminal, a cascading positive terminal and a cascading negative terminal; and a set of cells comprising (i) a first cell having a positive terminal and a negative terminal, the positive terminal being connected to a first cell terminal of the switcher chip and the negative terminal being connected to a second cell terminal of the switcher chip, and (ii) a second cell having a positive terminal and a negative terminal, the positive terminal is connected to a third cell terminal of the switcher chip and the negative terminal is connected to a fourth cell terminal of the switcher chip.

In some embodiments, the controller is operable to: (i) cause the battery module to configure the switches such that (a) the cells are connected in series, (b) current is able to flow out of the switcher chip via the main positive terminal but is not able to flow out the switcher chip via the cascading positive terminal, and (c) current is able to flow into the switcher chip via the main negative terminal but is not able to flow into the switcher chip via the cascading negative terminal, (ii) cause the battery module to configure the switches such that (a) the cells are connected in series, (b) current is able to flow out of the switcher chip via the cascading positive terminal but is not able to flow out the switcher chip via the main positive terminal, and (c) current is able to flow into the switcher chip via the cascading negative terminal but is not able to flow into the switcher chip via the main negative terminal, and (iii) cause the battery module to configure the switches such that (a) the cells are connected in parallel, (b) current is able to flow out of the switcher chip via the main positive terminal but is not able to flow out the switcher chip via the cascading positive terminal, and (c) current is able to flow into the switcher chip via the main negative terminal but is not able to flow into the switcher chip via the cascading negative terminal.

Other features are described below.

DETAILED DESCRIPTION OF EMBODIMENTS

Figure 1:
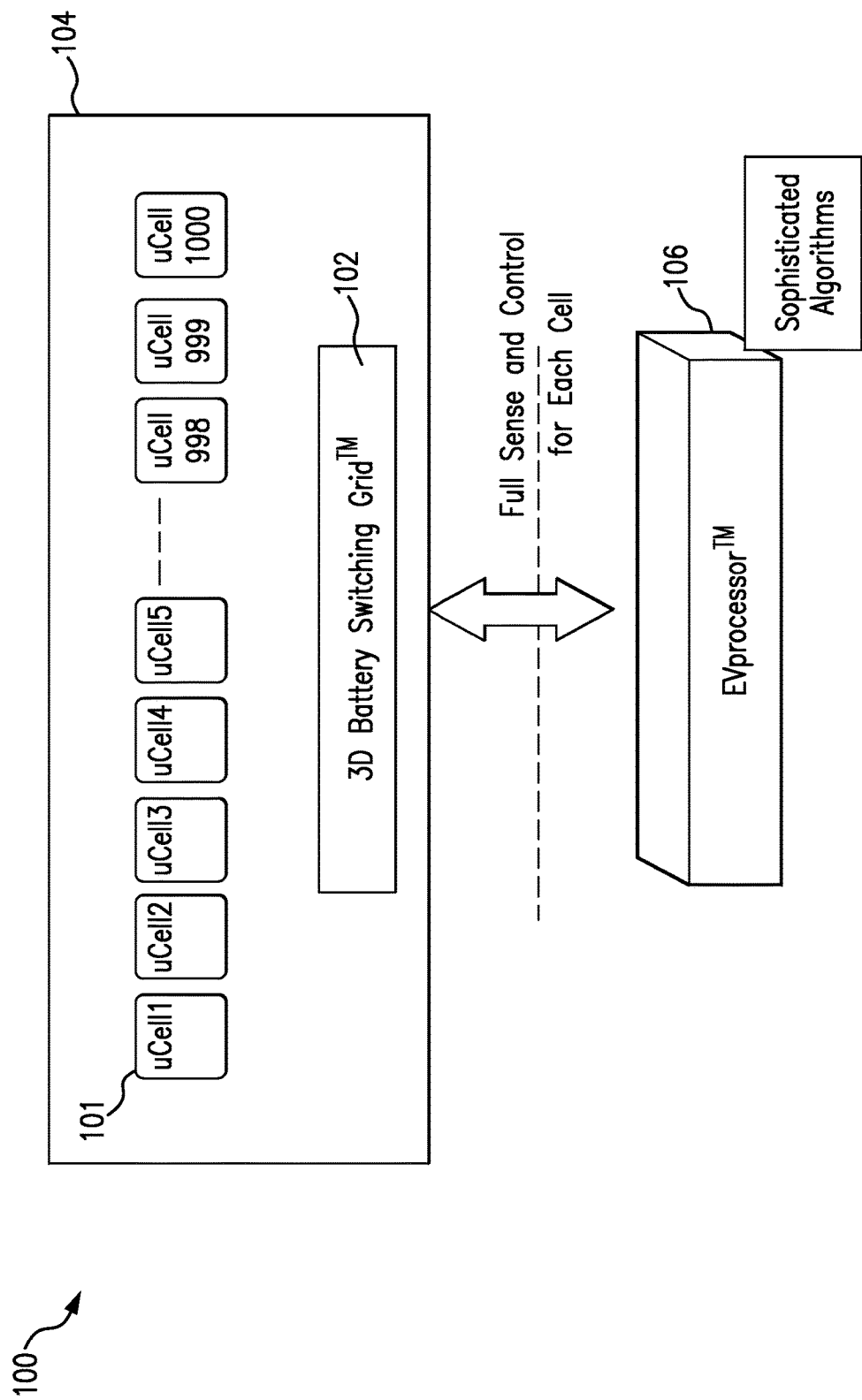
FIG. 1 illustrates an example battery pack system according to some embodiments.

Conventional battery pack systems comprise a moderate numbers of batteries and a number of controllers, each of which monitors a group of the batteries (e.g., 10 of the batteries) for safety reasons mostly. Such a controller senses the voltage, temperature, and current of each battery in the group and, during the regular operation of the battery pack, levels the amount of charge in each battery by discharging batteries that are overcharged. In the case of an emergency (e.g., when the temperature or voltage of a certain cell reaches a predefined value), the controller sends a signals to an aggregator controller that than shuts off a main power switch to disconnect the battery pack from the electric engine. This mechanism is fine for the sake of safety but does not apply to the other parameters needed from the battery pack.

It is well known in the industry that the nominal voltage of a cell is determined by the cell chemistry which is the electrochemical parameters of the chemicals used for the production. But when used, the actual voltage on the cell terminals changes over time and depends of various parameters that affect the internal impedance of the cells, like the ambient temperature, the state of charge of the cells, the age of the cell, as well as the actual load current.

In the case of EV batteries packs, the use of Li-ion is the most common and the nominal voltage value of each cell is 3.6V. Electric engines are commonly used in many transportation vehicles like trains and submarines, these engines are very efficient and produce gradable power depending on the voltage and current provided to them. The voltage and current range is in the order of hundreds, the voltage affects the rotation speed of the motor while the current determines the Torque. The power of the motor in horse power is positive proportional to the multiplication of the rotation speed by the Torque.

In order to reach the range of hundreds of volts, tens of cells are connected in series and then tens of chains are connected in parallel to support the peak current provisioning. Since the cells are manufactured in a relatively large capacity, if a certain cell is malfunctioning the effect on the whole battery pack performance is significant. Moreover, because the battery pack structure is fixed and predefined, this malfunctioning cell cannot be electrically excluded from the battery pack structure even though its impact on the power performance of the battery can be negative.

This adds to the fact that the battery parameters are changing over time and with regards to the environmental and use conditions and since the structure is predetermined and fixed in the production process it needs to be compensated by additional material in the cells that are connected in a non optimal fixed configuration. In practice, this fact leads the EV battery manufacturers to assign more than 60% more capacity in the battery pack design and manufacturing to overcome the discussed problems Referring now to FIG. 1, FIG. 1 is a diagram illustrating a battery pack system 100, according to some embodiments, which overcomes at least some of the deficiencies of conventional battery pack systems.

As shown in FIG. 1, battery pack system 100 includes a battery pack 104, which includes (i) several batteries 101 (e.g., several single cell batteries—which we shall refer to as a "cell") and (ii) a battery switching grid 102 (a.k.a., "3D Battery Switching Grid™"302) that enables the connection of the cells 101 in various different modes. In some embodiments, the 3D Battery Switching Grid includes a plurality of low cost chips (a.k.a., "switcher chips"), each of which is responsible for configuring a particular subset of the cells of the battery pack and each of which contains a set of switches connected to the particular subset of cells and circuit logic for controlling the switches. Battery pack system 100 may further include a main controller 106 (a.k.a., EV Processor™) that monitors the state of each cell by its sensing the cell's specific parameters (e.g., state of charge, voltage, current, temperature, pressure etc.) and controls the switching grid based on, at least in part, the current needs of the engine and the sensed parameters. The controller may also take into account the usage history of the cells, the manufacturer motor behavior diagrams, and driver history and desires. Accordingly, battery pack system 100 enables more efficient power utilization of the cells, increases safety, and provides the best suited power source for different motors and for the current needs of that motor based on the driver's behavior and directions and the driving environment. In some embodiments, the EV Processor incorporated within battery pack 104.

In some embodiments, as shown in FIG. 1, the battery pack system 100 includes a number of cells that are each monitored separately and can be electrically interconnected in various modes (e.g., parallel, serial or any other structure) during the usage by the car engine and during the charge time. This way in which the cells are electrically interconnected may be changed periodically by the EV Processor to best match the actual needs of the car (e.g., if high torque is needed the battery system can be configured to provide a maximum amount of current. The specific configuration of each cell is determined by its current status, its history and the current task being performed as well as environmental conditions.

For example, if the battery pack system 100 needs to perform in low temperature conditions more cells can be connected in series to compensate for the degraded voltage contribution of each cell. This method is also applicable for compensating of degradation in time. As another example, if a certain cell is malfunctioning, the malfunctioning cell may be electrically excluded from the battery pack structure and the negative effect of its fault will be prevented.

In some embodiments, the cells may be relatively small (e.g., the cells may have a relatively small capacity—such as 2 Ah v. 20 Ah, for example), in which case they may be referred to as micro-cells. With the use of micro-cells management tasks can be done at adequate granularity and the battery manufacturer can design the battery in a much more optimal manner and can than reach higher power capacity and better performance over time for the same weight and volume. Another advantage of using micro-cells is that because they are smaller they can be used more cycles and the heat dissipation from them is better.

An EV battery pack is a fairly large object that consumes significant car space and weight. There is a tradeoff in the design of a battery pack between energy capacity, space and weight—for the sake of more energy you would want to enlarge the battery pack, but this cost a lot in expensive material, space consumed in the car and additional car weight. Conventional battery packs are designed for providing the maximum voltage and current needed for the electric engine used and the energy capacity needed between charges and for the sake of the battery lifetime.

Since most EV battery packs today are made using Li-ion battery cells the cells need to be monitored for overheating and over charging or else a cell might explode. A battery cell that reaches 4.2v or a designated temperature given by the manufacturer is considered dangerous and provokes shut down of the main battery switch immediately causing the car to stand aside. This mode of operation is essential to the ability of using Li-ion in cars.

Figure 2:
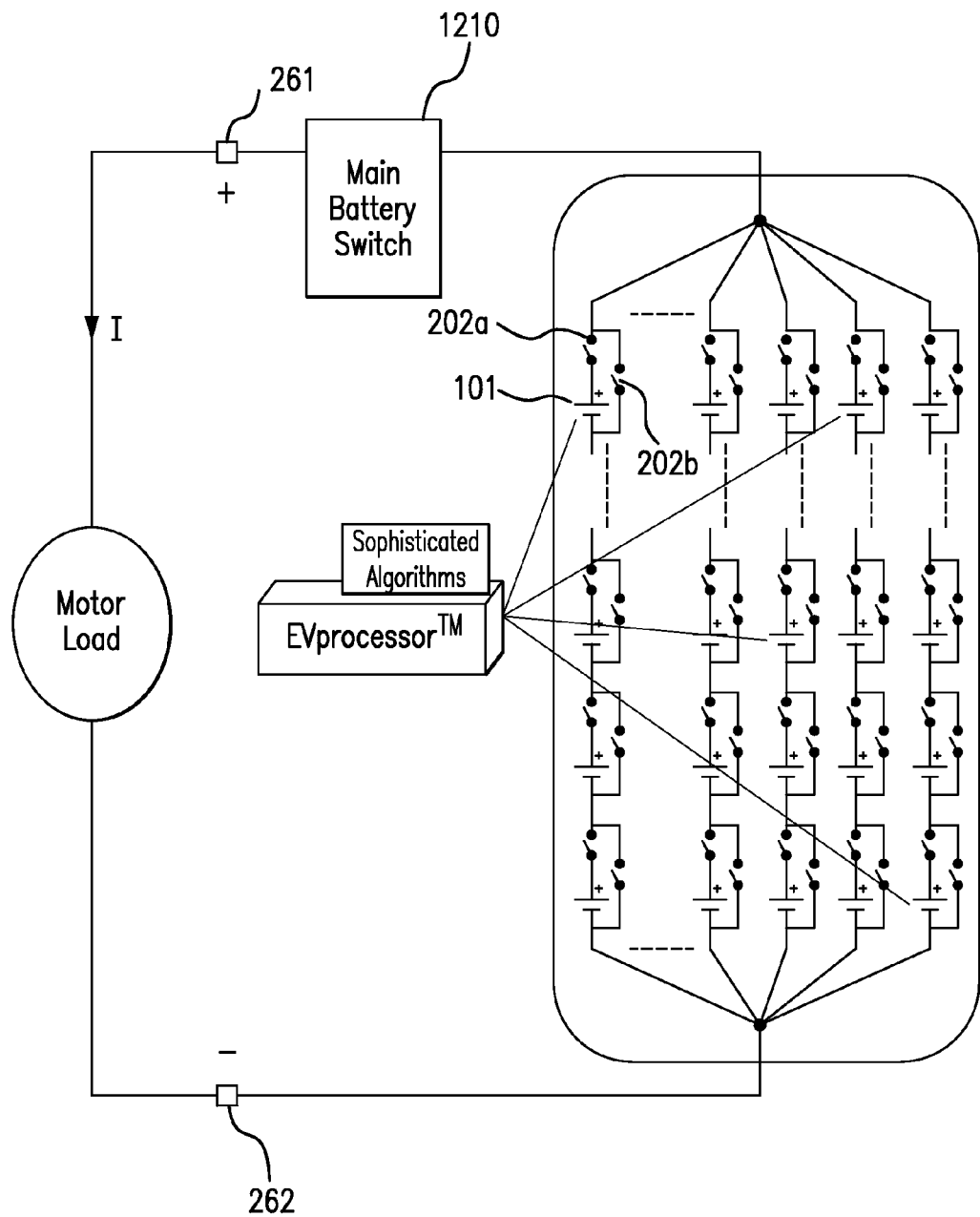
FIG. 2 illustrates further illustrates an example battery pack system and shows it being used in an vehicle having an electronic motor.

An improvement on conventional battery pack design is to add a switching grid (a.k.a., 3D Battery Switching Grid™) that will be comprised of multiple instantiations of a single low cost chip that enables controller 106 to manage each cell in the battery pack separately. Referring now to FIG. 2, FIG. 2 illustrates the 3D Switching Grid concept. As illustrated in FIG. 2, battery pack 104 includes not only a collection of cells 101, but also a collection of switches 202. As further illustrated in the embodiment shown in FIG. 2, at least two switches are present for each cell 101. In the example shown, switch 202a and switch 202b are used to either (1) connect cell 101a in series with other cells or (2) electrically disconnect cell 101a from all the other cells. Thus, each cell in battery pack 104 can be electrically included in the batter pack or electrically excluded from the battery pack.

The switching grid enables creating a structure that provides higher voltage, higher peak current or different cell order. It enables to charge the cells in different order and to use part or all of the cells in different utilization cases and by that optimizing the wear-out of the battery over the years. It will also enable to employ a safer use method because of the ability to temporarily or permanently electrically exclude malfunctioning cells from the pack 104 in an early stage of a problematic situation without the need to switch off the whole battery and stop the car.

Figure 3:
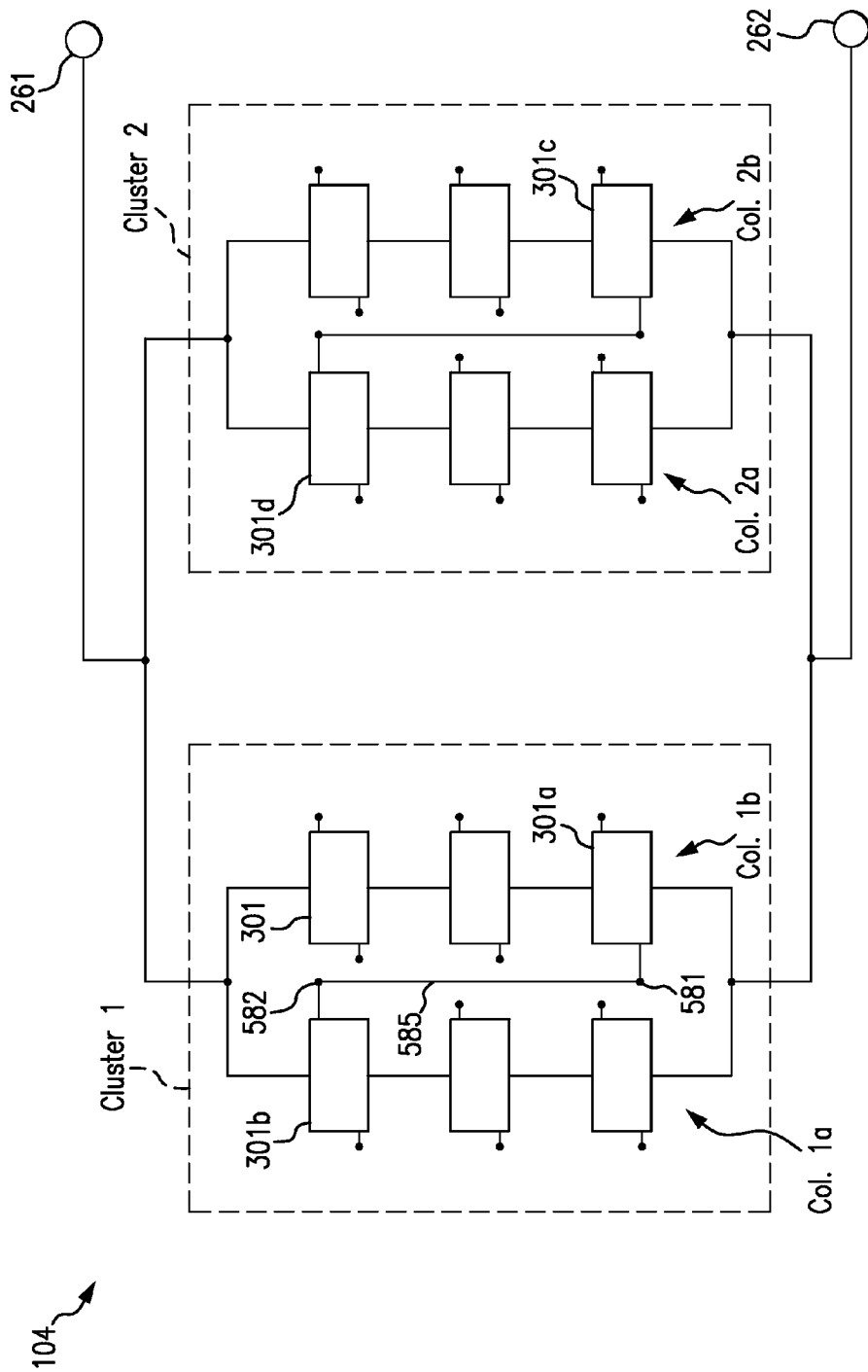
FIG. 3 illustrates an example battery pack according to some embodiments.

Referring now to FIG. 3, FIG. 3 illustrates an example structure of battery pack 104 according to some embodiments. As shown in FIG. 3, the example battery pack 104 includes two clusters of battery modules 301. The first cluster (cluster 1) is made of two sets (or "columns") of M battery modules (col. 1a and col. 1b) and a cascade wire 585 that is used to connect col. 1a and col. 1b in series. Likewise, the second cluster (cluster 2) is made of two sets (or "columns") of M battery modules (col. 2a and col. 2b) and a cascade wire that is used to connect col. 2a and col. 2b in series. In the example shown in FIG. 3, M=3. In some embodiments, battery module 301 includes a set of cells (e.g., 4 cells, 8 cells, or some other number of cells) and a component of the switching grid 102 (e.g., one of the switcher chips mentioned above that contain a set of switches).

Depending on how switches within battery modules 301a and 301b are configured, col. 1a will either be in parallel with col. 1b or they will be in series. Likewise, depending on how switches within battery modules 301c and 301d are configured, col. 2a will either be in parallel with col. 2b or they will be in series. Thus, for each cluster, the columns of the cluster may be connected in parallel or in series. However, in the embodiment shown, no column of cluster 1 can be connected in series with a column of cluster 2. Accordingly, battery pack 104 may have at least two modes of operation: in one mode the columns in each cluster are connected in parallel and in another the columns in each cluster are connected in series. It is not required, however, that all columns in a cluster be connected in series or parallel. For example, with a cluster having four columns, the cluster may be configured such that columns 1 and 2 are in series thereby forming a first meta-column and columns 3 and 4 are in series thereby forming a second meta-column and the first meta-column is in parallel with the second meta-column. As described further herein, there may be yet additional modes of operation because each battery module 301 can be configured such that it produces Va volts or Vb volts depending on whether the cells of the battery module are connected in series or parallel. If each battery module produces Vi volts (e.g., Va or Vb) and the all the columns of each cluster are connected in parallel, then the battery pack 104 produces M×Vi volts. However, if each battery module produces Vi volts and the columns within each cluster are connected in series, then the battery pack 104 produces B×M×Va volts, where B is the number of columns in the cluster. As described herein, a main controller may configured battery pack 104 based on, for example, data regarding the needs of the engine and/or the environment. Thus, if the engine requires a high voltage, the main controller could send one or more commands to the battery pack that cause the battery pack to connect the columns within each cluster in series and/or the cells within each battery module in series. Likewise, if the engine requires a high peak current, the main controller could send one or more commands to the battery pack that cause the battery pack to connect the columns within each cluster in parallel and/or the cells within each battery module in parallel.

In the above structure, if one or several battery modules within the column are malfunctioning, then the influence of these battery modules on the whole pack can be trimmed by using switches within the battery module to bypass the battery modules temporarily or permanently. Another advantage of the above structure is that the energy capacity redundancy designed by the manufacturer can be spread wisely within the pack and can be utilized to provide more current or more voltage according to the actual needs of the engine in any given time.

Referring now to FIGS. 4-8, FIGS. 4-8 illustrate an example battery module 301, which includes four batteries c1, c2, c3, c4 (e.g., four micro-cells), a set of switches (s0 through s14), a main positive terminal 402, a main negative terminal 404, a cascading positive terminal 582, and a cascading negative terminal 581. For simplicity, we shall refer to the batteries c1-c4 as cells with the understanding that the batteries are not limited to single-cell devices.

Switches s1-s4, s6-s8 and s10-s13 are used for interconnecting cells c1-c4, while switches s0, s5, s9 and s14 are used for cascading columns in a cluster. That is, switches s0, s5, s9 and s14 enable the battery module to connect in series with another battery module in a neighboring column of the same cluster. For instance, terminals 581 and 582 are each connected to a respective cascade wire. The other end of the cascade wire is connected to a corresponding cascade terminal in a battery module that is positioned in an adjacent column. For instance, as shown in FIG. 3, terminal 581 of module 301a is connected to wire 585 and the other end of the wire is connected to terminal 582 of module 301b. To connect col. 1a in series with col. 1b, then (A) module 301a is configured such that the following switches are closed s4-s8 and the others are open and (B) module 301b is configured such that the following switches are closed s6-s10 and the others are open As illustrated in FIGS. 4-8, a battery module (components of which may be formed on a single chip) according to various embodiments of the invention is capable of switching C cells that can be connected in serial, parallel or excluded from the grid. For example, a battery module is capable of electrically connecting C cells in parallel or in series. As another example, for each one of the C cells, the battery module can electrically disconnect the cell from all of the other cells in the battery module. Accordingly, a battery module has responsibility for C cells of the battery pack.

Thus, if one or several cells within the module are malfunctioning, then the influence of these cells on the whole pack can be trimmed by using the switches within the battery module to bypass the cells temporarily or permanently. Another advantage of the above structure is that the energy capacity redundancy designed by the manufacturer can be spread wisely within the pack and can be utilized to provide more current or more voltage according to the actual needs of the engine in any given time.

As mentioned above, components of battery module 301 may be implemented as an integrated circuit or "microchip" ("chip" for short). That is, in some embodiments, battery module 301 comprises a chip and a set of cells connected to the chip. The chip is responsible for configuring the set of cells. For example, the chip is responsible for connecting the cells either in series with each other or in parallel with each other. The chip may include digital, analog and communication components. The chip may make use of a noise-resilient communication module that decreases possible control errors to the automotive levels needed as well as prevents unauthorized designers to make use of the module. In some embodiments, the chip uses Power FET technology for the switching elements enabling very low Rds-on that leads to low self power dissipation needed for energy efficiency. The chip may also include a safety switching sequencer that manages the exact switching sequence and time of an individual cell to prevent hazardous situations. In some embodiments, the chip may include a small CPU and software code that in addition to taking actions in response to commands received from a controller can also act like a controller for certain tasks and react to specific localized situations and take autonomic specific actions such as, for instance, immediately switching-out a certain cell, or several sells, that the chip senses is malfunctioning.

The switching elements need to support switching time that relates to the application using the battery. In the case of an EV car, the switching time needed is relatively slow and do not pose significant needs from the switching elements, for instance the Power MOSFET mentioned The constellations in which the switching elements are arranged within the battery module determines the level of flexibility when building the battery switching grid. It is preferable to keep the number of switching elements per battery module as low as possible in order to be able to design a cost effective solution. Moreover, it is also preferable that each of the switching elements need to bear only 1×I and thus can be relatively small. The connection that aggregate the currents from several cells is done outside the chip of the battery module and utilize several terminals of the chip.

Figure 5:
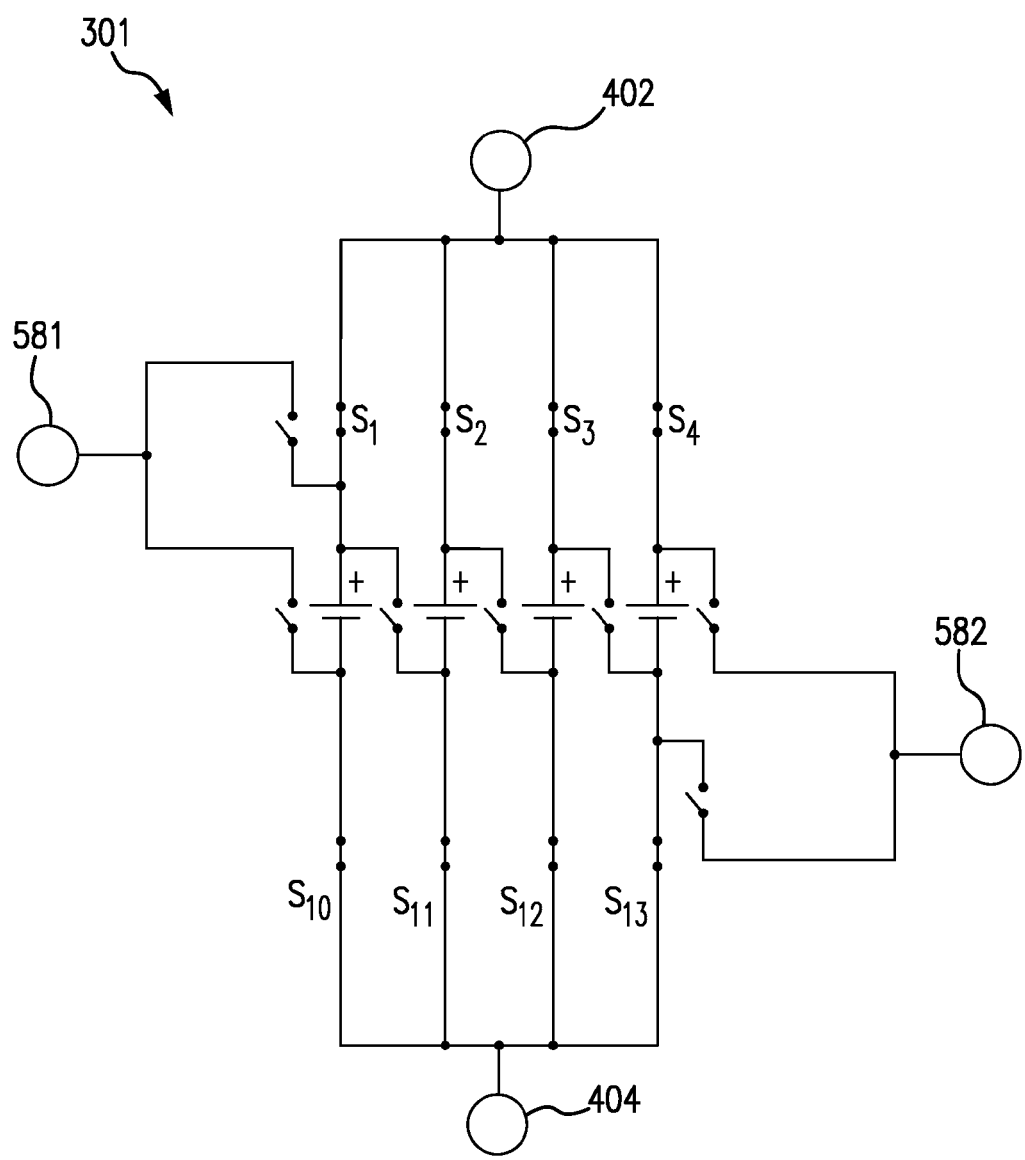
Figure 6:
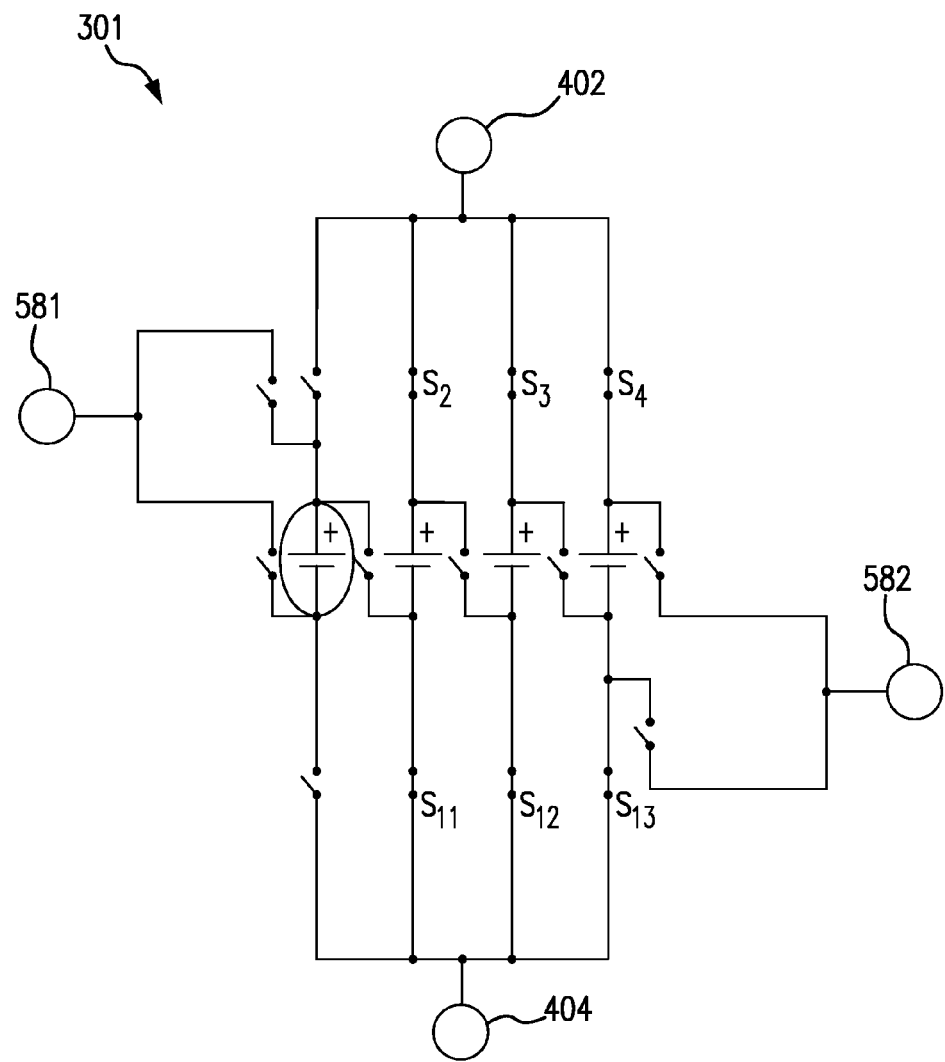

FIG. 5 shows the battery module being configured such that all of the cells of the module are connected in parallel with each other. That is, c1 is parallel with c2, which is parallel with c3, which is parallel with c4. This is accomplished by closing switches s1-s4 and s10-s13 and keeping the others open. FIG. 6 shows the battery module being configured so that cell c1 is excluded from the parallel circuit. This is accomplished by closing switches s2-s4 and s11-s13 and keeping the other switches open.

Figure 7:
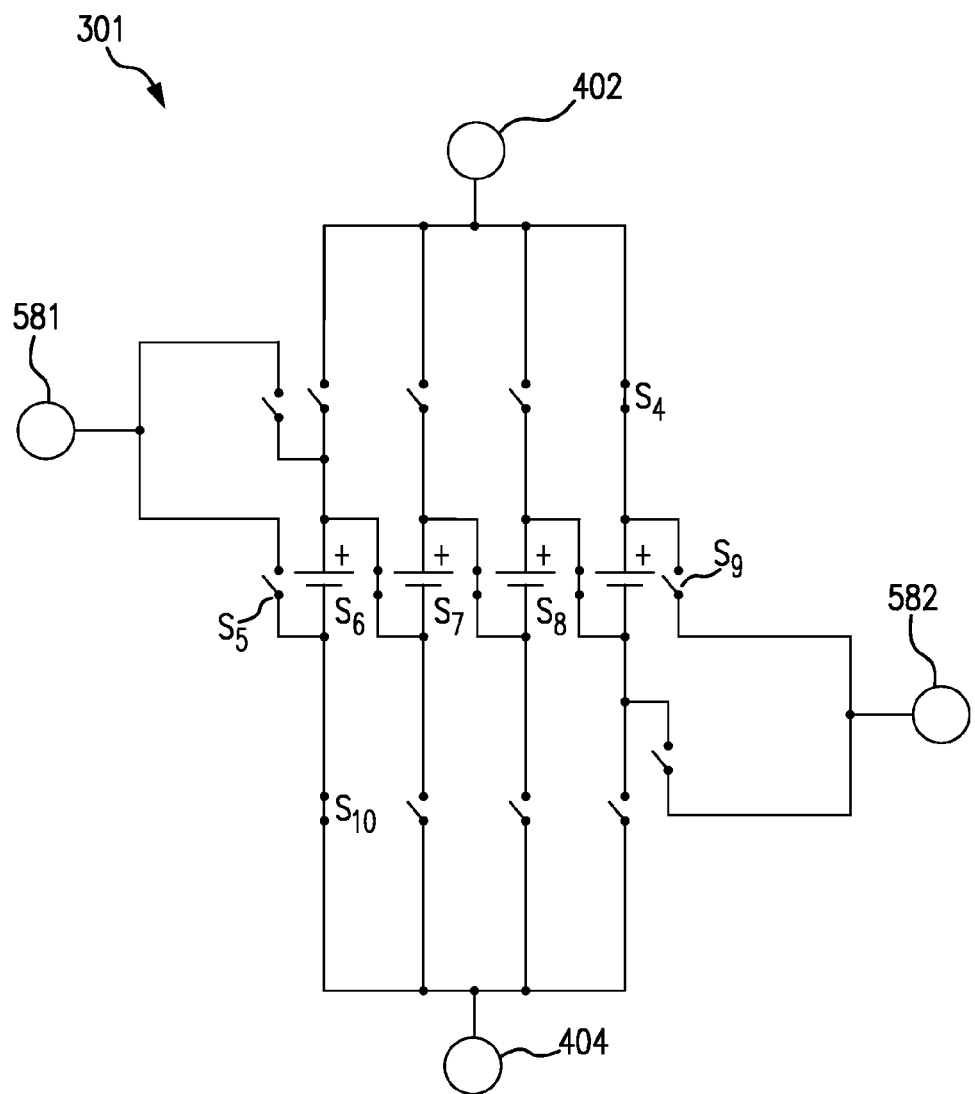
Figure 8:
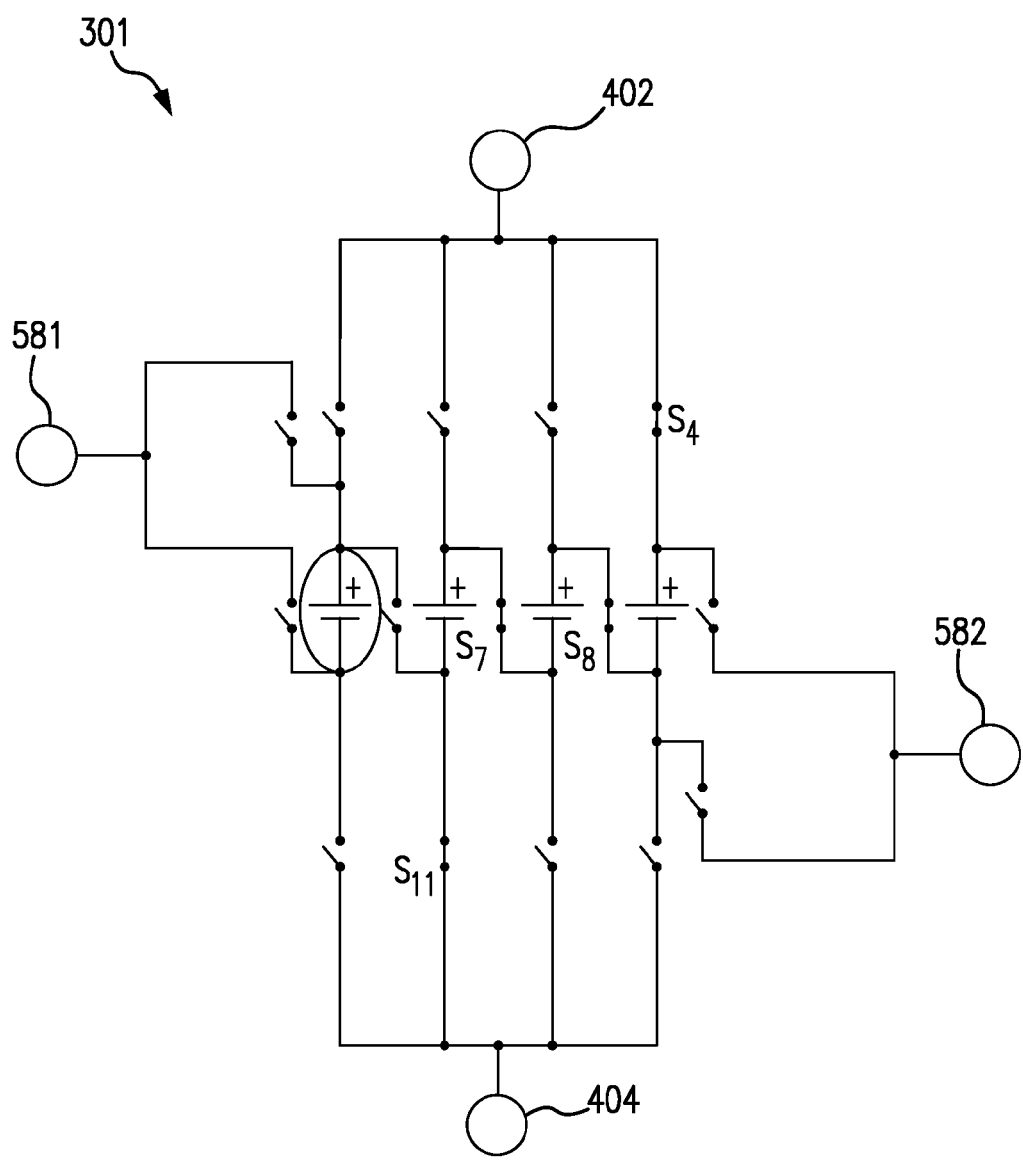

FIG. 7 shows the battery module being configured such that all of the cells of the module are connected in series. That is, c1 is in series with c2, which is in series with c3, which is in series with c4. This is accomplished by closing switches s4, s6-s8, s10 and keeping the others open. In this configuration, current (i.e., conventional current) is able to flow out of main positive terminal 402 and current is able to flow into main negative terminal 404. If cascading is desired, then switches s5 and s9 are closed and switches s4 and s10 are opened. In this cascading configuration, a current is able to flow into cascading negative terminal 581 and then through cells c1-c4 and then out cascading positive terminal 582. FIG. 8 shows the battery module being configured so that cell c1 is excluded from the series circuit. This is accomplished by closing switches s4, s7, s8, s11 and keeping the others open.

As is illustrated in FIGS. 6 and 8, the switches are connected in a way that enables to still make use of most of the other cells while the problematic one is fully excluded from the module. Preferably, the switches (e.g, Power FETs) have a very high switch-off impedance thus enable to safely exclude cells that are malfunctioning without the need to activate a main switch 1210 (see FIG. 2 or FIG. 12) and causing the car to stop.

Since electric engines need high current in order to produce high torque and high voltage to produce high speed, the needs from the battery are changing from the start of movement of the car that needs high current to the state when the car needs to increase the speed and the engine need high voltage. The common range of the voltage needed is 48 to 800 volts and the current changes between several to 300 Amperes. This configuration enables a dynamic power range of 1:C, where C is the number of cells handled by each battery module, meaning it can drive C times the basic current or C times the basic voltage or any in between.

Figure 4:
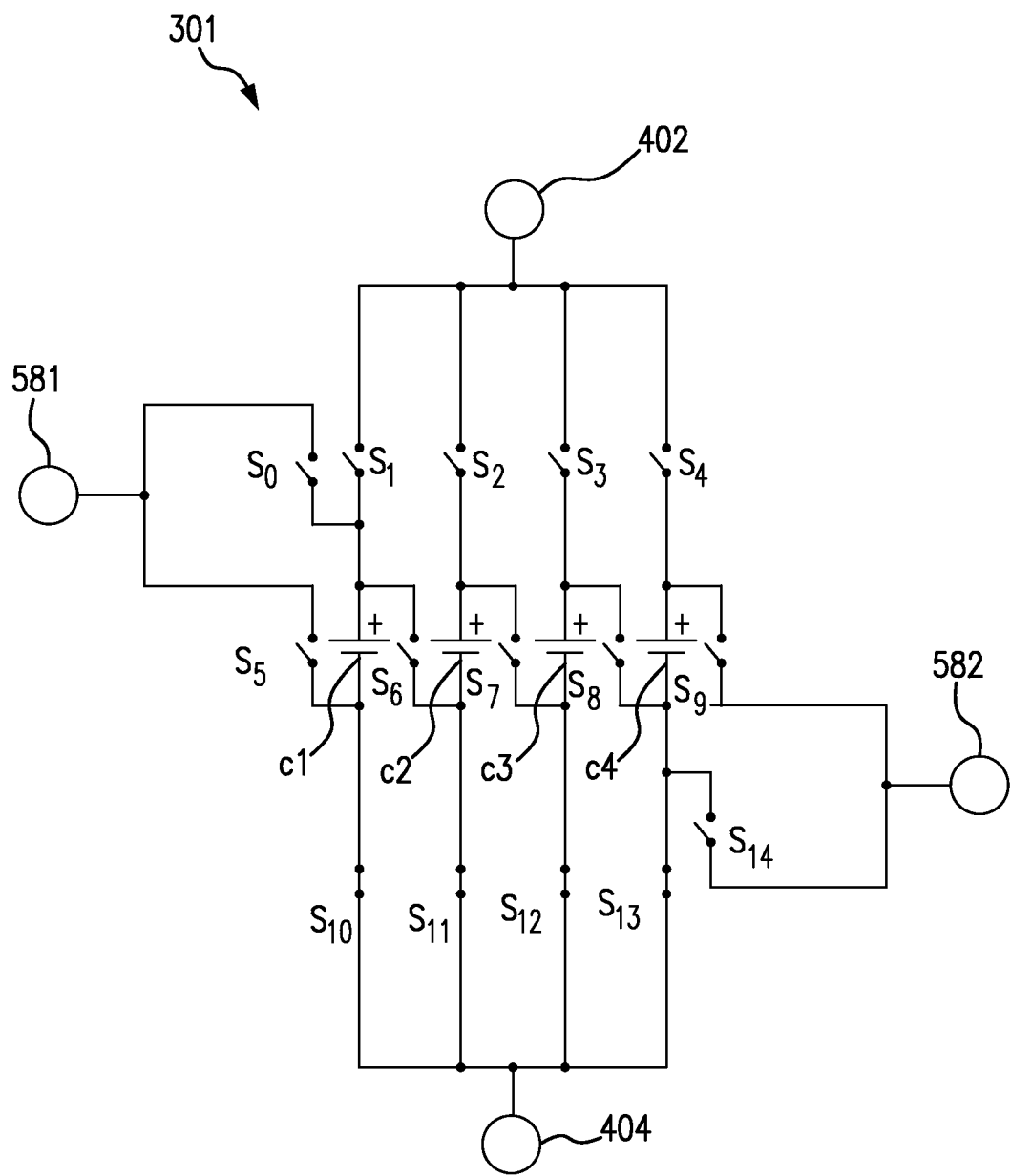
FIGS. 4-8 illustrate an example battery module according to some embodiments.

As described above, in the example battery module 301 shown in FIG. 4, which module is responsible for four cells (c1-c4), switches are connected in a way that enables the battery module to connect the cells in parallel or series connection. Moreover, as discussed above, other switches enable the cascading of columns within structure to support much higher battery voltages. This structure benefits a high level of flexibility while still maintaining relatively low number of switches and simple routing structure. The above configuration is unique also because the aggregation of the current from each of the branches is done in the wiring outside of the battery module, enabling each Power FET to be designed to transfer only 1×I current, keeping the area of the chip as small as possible and enables the lowest cost.

Figure 13:
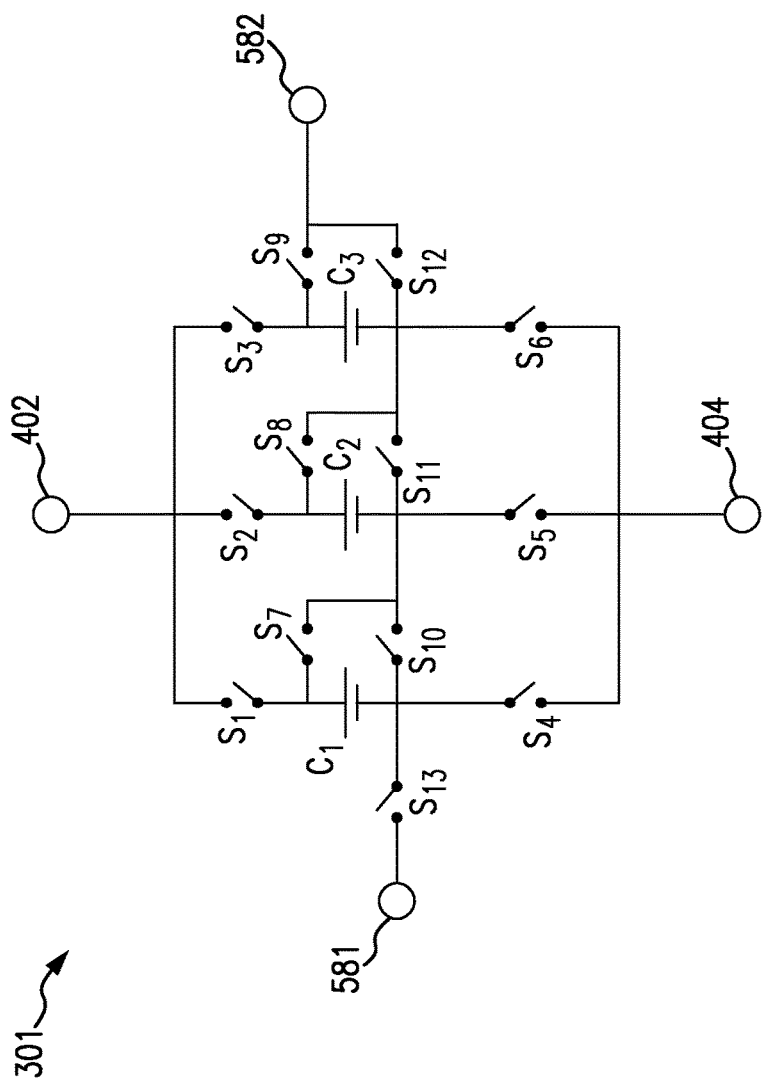
FIG. 13 illustrates a battery module according to another embodiment.

Referring now to FIG. 13, FIG. 13 illustrates a configuration of battery module 301 according to another embodiment. In this example, three cells are shown for the sake of simplicity. In this embodiment, switches s1-s8 and s10-s12 are used for interconnecting cells c1-c4, while switches s9 and s13 are used for cascading columns in a cluster. In this embodiment, each cell can individually be disconnected from the other cells when the module is in the series arrangement. For example, if the cells are connected in series and then it is determined that cell c2 is bad, c2 can be disconnected by opening switch s8 and closing switch s11.

Figures 14A, 14B, 14C:
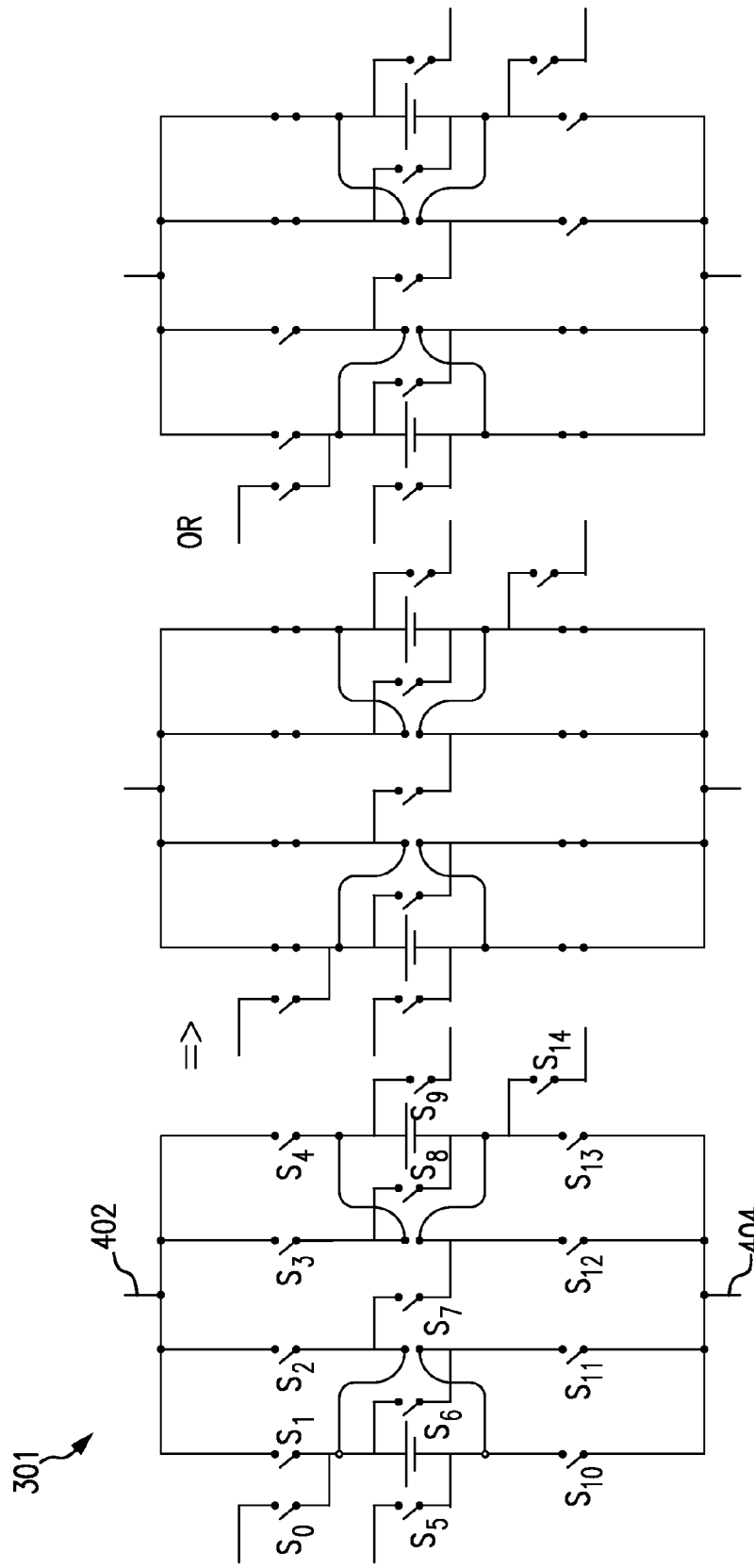
FIGS. 14A, 14B, and 14C illustrate a battery module according to still another embodiment.

Referring now to FIGS. 14A, 14B, and 14C, these figures show an embodiment of battery module 301 that is similar to the embodiment shown in FIG. 3. One difference is that there are no middle cells and the cells that are used have higher current capacity than the cells used in the embodiment shown in FIG. 3. This embodiment illustrates that the same chip used in the battery module shown in FIG. 3 can be re-used to implement other configurations.

Referring back to FIG. 3, while FIG. 3 shows that the example battery pack includes only two clusters, a batter pack according to other embodiments may have more clusters. Likewise, while FIG. 3 shows that the example battery pack includes only two columns per cluster and three battery modules 301 per column, other embodiments may have other configurations.

Figure 9:
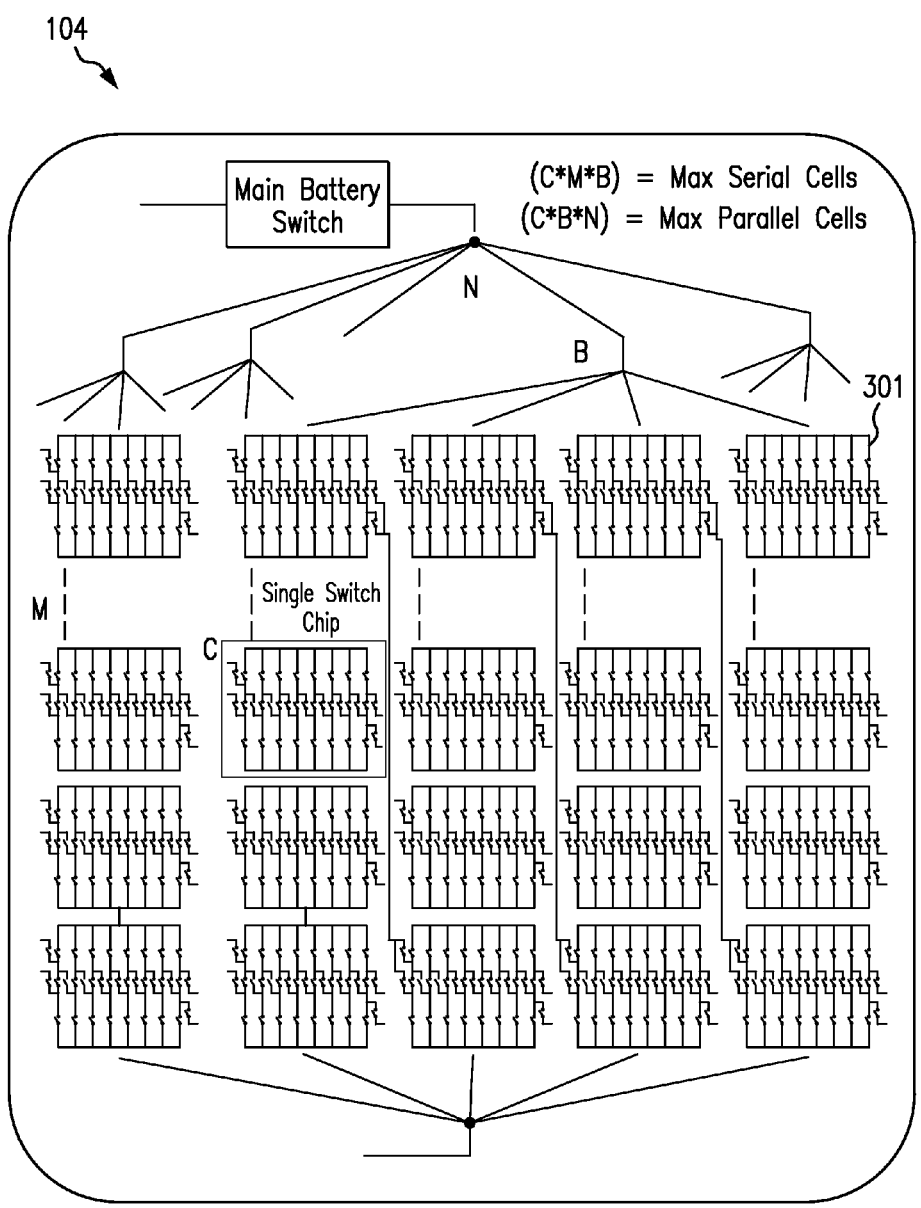
FIG. 9 illustrates another example battery pack according to some embodiments.

For example, FIG. 9 shows an embodiment of battery pack 104 that includes N clusters of battery modules, where each cluster includes B columns of battery modules, where each column includes M battery modules, for a total of N×B×M battery modules. Each battery pack can be designed with different parameters of C, M, B and N, thus best matching the need of the specific car or manufacturing line. In one arrangement, each cluster is connected in parallel with each other cluster. For each cluster, the columns of the cluster may be connected in parallel or in series. For each column, the battery modules of the column are capable of being connected in series.

An advantage of this structure is the ability to limit the current that is passing through each Power FET within the battery module to 1×I, where I is the maximum current supported in the specific design. This means that in any configuration of the switching controls of the battery module the aggregation of the current is done by the special wiring structure outside of the battery module itself, enabling a cost effective solution. Currently we found out that a cost-effective constellation is built out of switchers with C=4 to 16. More preferably, in some applications, C ranges between 8 and 12.

The implementation of many parallel structures enables the use of relatively small Power FET that can be designated to small current and voltage with lower Rds-on resistance, thus dissipates a smaller amount of power and become energy efficient.

Specifically, this structure enable the connection of C×B×N cells in parallel providing maximum current of I×(C×B×N) to be drown out of all the cells and with the change of controls it enables the connection of C×M×B cells in series, reaching V×(C×M×B) volts. The cascading of the columns within each cluster is enabled by the arrangement of switches that are used to interconnect the battery modules (see FIG. 3). This ability to draw high current and reach very high voltage enables the manufacturer of the car to reach better care performance without the limitations of fixed battery structure and is the outcome of the constellation of the switching elements within the battery module together with the specific routing design of the 3D Battery Switching Grid™ outside the battery module.

Figure 10:
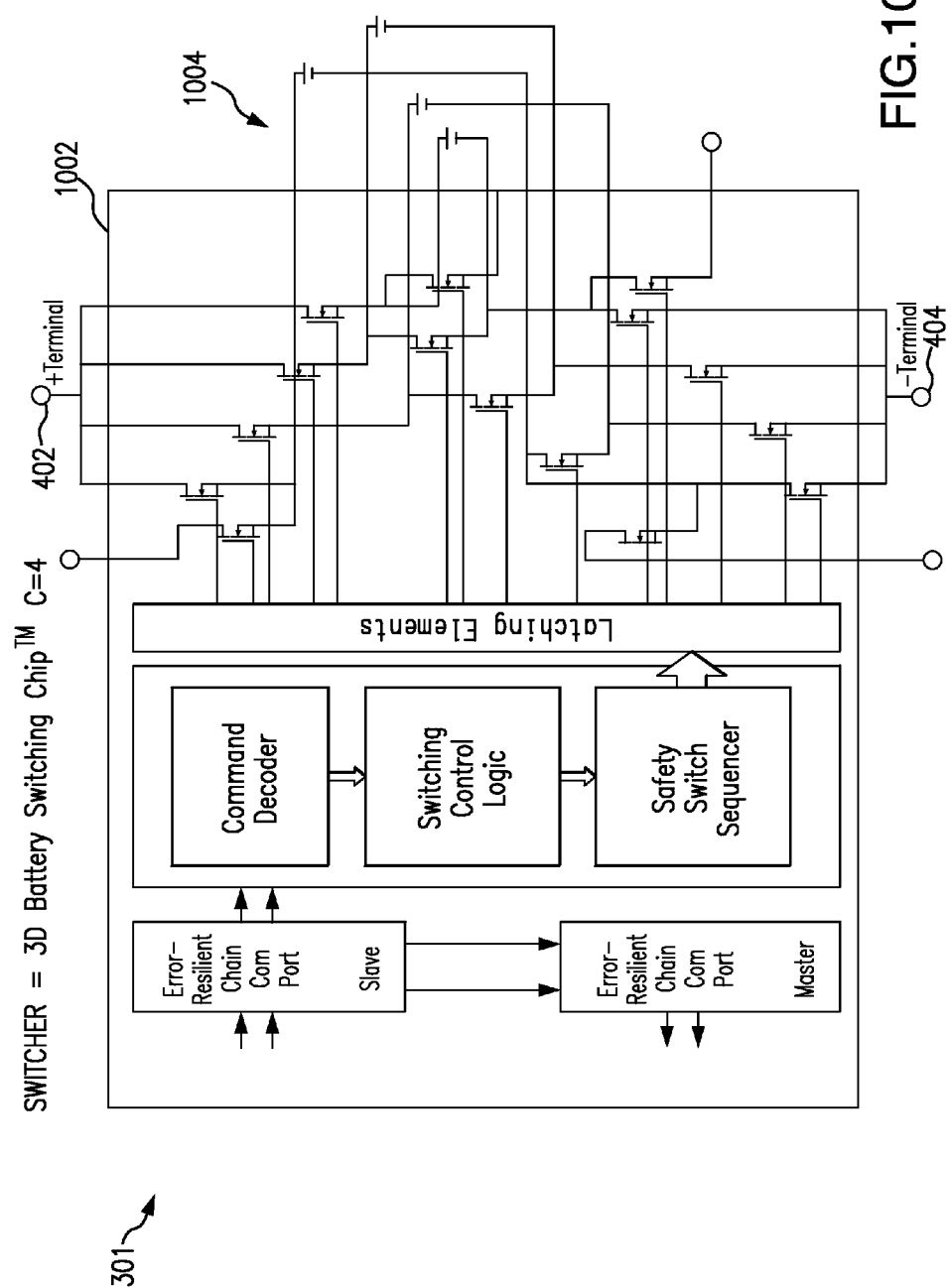
FIG. 10 illustrates another example battery module, according to some embodiments, that is based on a special dedicated chip.

FIG. 10 is a block diagram of an example battery module 301 according to some embodiments. In this embodiment, the battery module 301 includes (a) a chip 1002 containing switches and control circuitry and (b) a module of cells 1004 (in this example the module of cells includes four cells, other configurations are possible, such as 8 cells, which has been found to be a cost effective number of cells). The example chip 1002 shown in FIG. 10 is comprised of an analog and a digital part. The analog part is built out of Power MOSFETs that are arranged in the special constellation as described above. On one embodiment the number of switches (e.g., Power MOSFETs) is 3+3*8=27.

These analog switches are controlled by the digital part of chip 1002 that is comprised of several blocks: a communication module that is capable of receiving switching commands from the EVProcessor™ in an error-resilient fashion to meet the car safety standards. This module is built out of a master (e.g., transmitter) and a slave (e.g., receiver) to enable a serial transfer of commands between one battery module to the other and by that minimize the number of wires transferring the switching commands within the battery pack. In some embodiments, the slave communication unit of a switcher chip 1002 (i) receives switching information from the master communication unit of an upstream switcher chip 1002, (ii) selects the switching information that is addressed to it, and (iii) transfers to the next chip in the communication chain trough the master communication unit the remainder of the switching information that it received from the upstream chip. In this manner we save on the number of wires that runs in the battery for transferring the switching commands. That is, for example, the battery modules may be configured in a daisy chain arrangement where one of the battery modules is configured to receive switching information from an outside controller and then pass some, none or all of that switching information to the next battery module in the communication chain, which module then does the same thing for the next battery module in the chain, etc.

A command decoder checks the received command to eliminate possible functional errors that might create improper switching situation within the battery module or on a larger scale in the module or pack and translates the command for the switching control logic.

The switching control logic breaks the switching orders into actual on-off orders for each of the switching elements within the battery module.

The safety switching sequencer receives the on-off commands for each of the switches and determines the exact sequence and timing in which each of the Power FETs needs to be switched. It takes into consideration the speed of the switching element, energy consumption during the switching sequence and of curse safety reasons not to short any of the cells or create even momentarily an imbalance structure within the module or pack.

The EVProcessor™ 106—Sophisticated Powerful Controller

The idea of using many small battery cells is incorporated with the use of a special powerful chip that can handle efficiently the implementation of the switching scheme according to the currently needed task and usage method.

Figure 11:
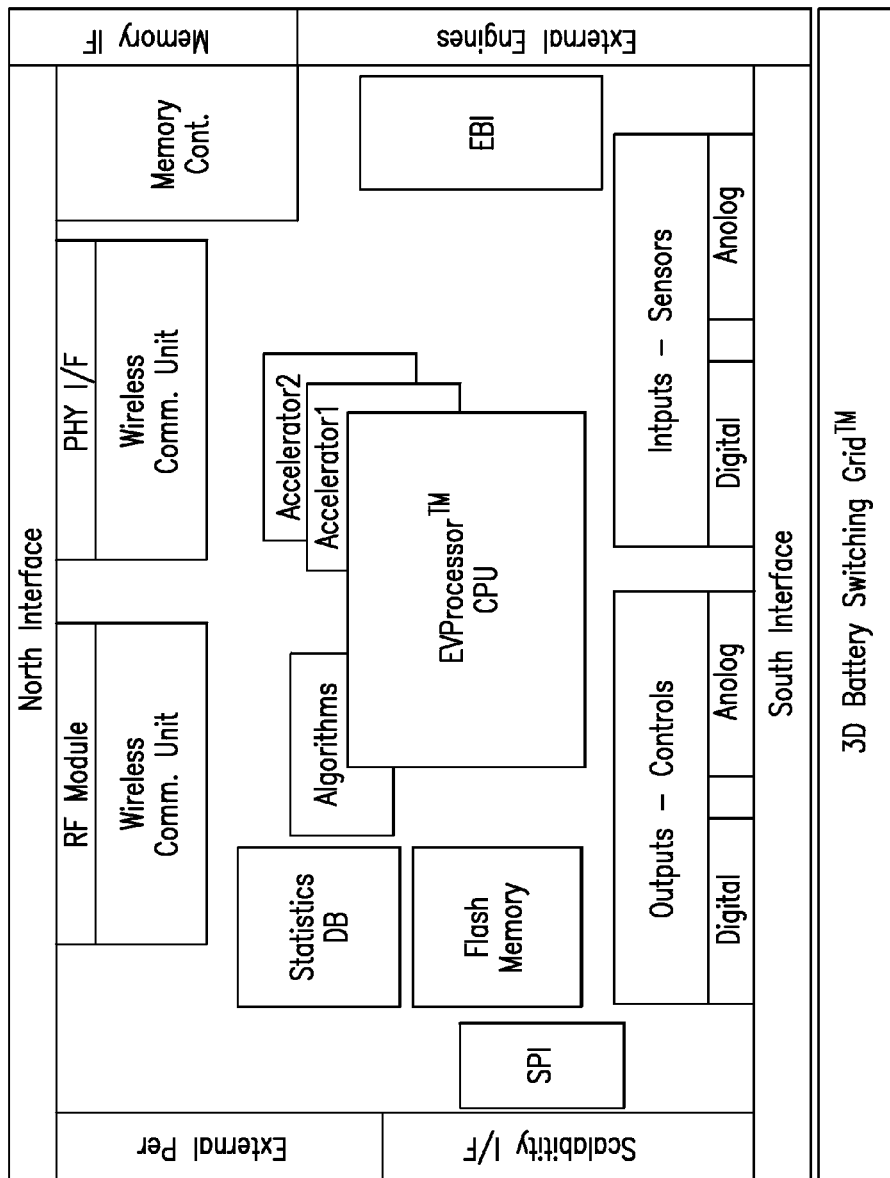
FIG. 11 is a functional block diagram of a main controller according to some embodiments.

FIG. 11 is a functional block diagram of such proposed EVProcessor™ 106.

The EVProcessor™ is based on a processing device that can run sophisticated algorithms and make use of various different accelerators that optimally match the computational tasks needed in order to utilize the EV battery efficiently by the electric engine and to enable more longevity and safety.

The EVProcessor™ implements control and "wear-out" algorithms enabling to manage each of the cells within the battery modules. This innovative way of managing the battery cells will increase the energy efficiency of the battery enabling longer car distance drive and decrease the cost of the battery. The solution will also increase the safety usage of the battery by disconnecting malfunctioning individual cells from the pack without the need to stop the car and will decrease the type-2 errors of "faulty state of charge" from the same reason.

The EVProcessor™ runs two separate SW models: SmartLoad™ is an element which manages individual cells at all conditions and significantly improves battery pack performance and DynamicPower™ is a vehicle-system fed component that is designed to deliver voltage and current conditions matching the current specific engine needs in optimum fashion to the EV's inverter 1202 (see FIG. 12).

While SmartLoad™ is a standalone battery system booster that outsmarts existing EV batteries by handling cells individually, rather than the battery pack as a whole, DynamicPower™ requires integration with carmakers and presents, beyond energy savings, an increased driving performance with simplified and cheaper inverter 1202.

The EVProcessor™ can sense the battery cells by means of analog or digital inputs, it can manage the cells switching grid (i.e., the switches within pack 104) using the digital outputs, it can connect to additional devices trough the scalability port, it can make use of its internal memory and Flash to hold the battery history and statistics for each cell and can extend this DB to an external memory. It can also connect to external engines through its specific bus and can communicate with the car main controller or other devices by means of wired or wireless connections to manage battery storage for instance.

The ability to change the structure of the battery on-the-fly and in a dynamic manner that best matches the environmental and engine changing needs and that can compensate different time degradation effects and malfunctions of part of the cells redefines the battery specification and largely affect the ability to use it in different scenarios with changing parameters and environments especially cover for temperature changes.

Figure 12:
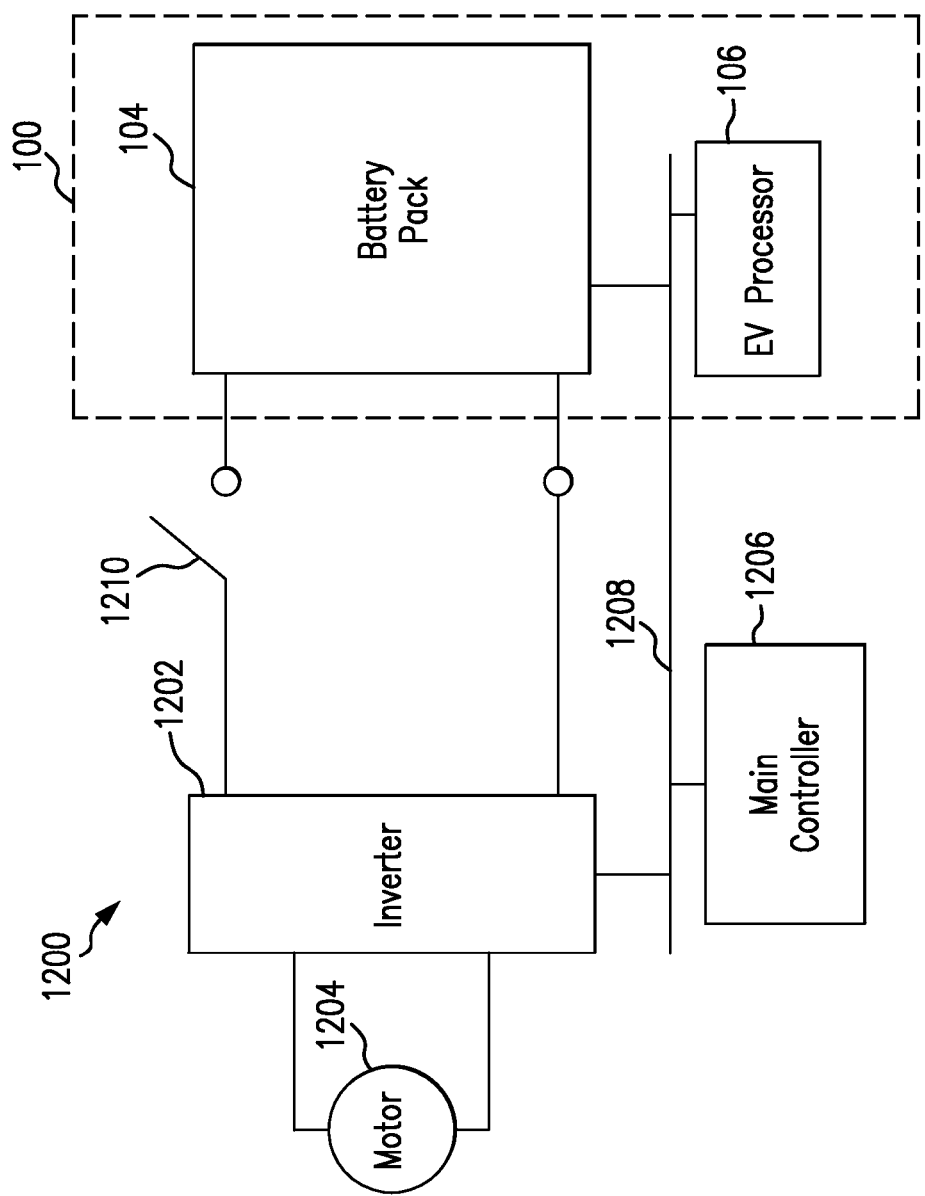
FIG. 12 illustrates an environment in which a battery pack system according to some embodiments may be used.

FIG. 12 illustrates an example EV power train system 1200 that includes an embodiment of battery pack system 100 described herein. As shown, system 1200 includes a motor 1204 connected to an inverter 1202 that is electrically connected to the output terminals of battery pack 104, thereby receiving current output from battery pack 104. System 1200 also includes a main controller 1206 and a bus 1208 that allows the components to communicate. For example, EVProcessor™ can use bus to obtain data from main controller and to provide commands to battery modules 301 within battery pack 104. The EVProcessor™ can also reside inside the battery pack 104 or as part of the main controller 1206 in the form of control-software and algorithms.

EXAMPLES

1. A Cell is Producing Lower Voltage than the Rated Voltage

Because of the chemical structure a certain cell within the battery pack can become defected, let's say because of production fault and produces less than the rated voltage. In the current structure of the battery pack this cell will continue to appear in the serial structure of the chain and the outcome will be that the voltage that is produced out of the battery is constantly reduced by that amount. Over time, more and more cells are producing less voltage and the battery output voltage is dropped significantly.

To overcome this problem the manufacturer is using additional spare cells in series that leads to higher voltage than the actual needed and is than dropped within the system.

With the systems described herein, for a certain interval of time, the EVProcessor™ reads the current engine speed, determines the best appropriate voltage for that speed, and calculates the number of series cells needed to supply the best appropriate voltage. This can be done by utilizing the engine manufacturing information that specifies the best appropriate voltage per each speed. It than reads a cell history database and reviews the amount of usage cycles of each cell. The processor also read the current voltage of each cell and decides for the coming period of time which of the cells will be used and how many cells will be connected in serial and in parallel.

In some embodiments, the use of many micro-cells instead of large cells enables the processor to control the battery voltage in fine granularity and if a certain cell is malfunctioning and kept aside the overall effect on the battery capacity is negligible.

The outcome of this periodically continues process is that the voltage that the battery produces can be kept constant over time and overcome the hurdle of loss of voltage because of wear-out of certain battery cells within the chain.

The battery manufacturer can than specify less redundant cells within the battery structure because it can use less serial constantly connected cells and this additional cells can support the parallel structure instead to provide for the needed peak current.

2. Voltage Drop Because Of Environmental Temperature

It is well known that batteries are producing less voltage if the ambient temperature drops significantly. To overcome this problem the manufacturers are specifying additional series cells that in regular ambient temperature are than producing excessive voltage than needed and is than dropped within the system.

With the systems described herein, for a certain interval of time, the EVProcessor™ reads the current engine speed and calculates the amount of series cells needed to supply the best appropriate voltage. It than reads the cell history database and review the amount of usage cycles of each cell. The processor also read the actual voltage of each cell that is with respect to the current ambient temperature and decides for the coming period of time which of the cells will be used and how many cells will be connected in serial and in parallel.

3. Efficient Battery Charging

In the case of such large batteries that are comprised of many cells, that need to perform well over a long period of time, say 5 years in Li-ion car batteries, the charging task is becoming critical for the lifetime of the battery and the safety of the user. The current constant structure of the battery poses a process of charge that involves all the battery cells at once. This process of charging can be harmful if a certain cell is overcharged and for that there is a safety leveling mechanism that discharges the cells to a certain voltage, keeping all the cells in a predefined voltage range.

With the systems described herein, for a certain charge interval of time, the EVProcessor™ reads the actual voltage of each cell and the cell history database to review the amount of charge cycles the cell have already passed. It than decides for the coming period of charge time which of the cells will be charged and how many cells will be connected in serial and in parallel in order to create the best charge current flow. Cells that reach the maximum voltage allowed are kept aside while other cells charge continues. This enables charge of all of the cells to their maximum capacity. In this manner the full capacity of the battery can be used.

The outcome of this charge process is that cells that don't need to be charged are kept out of the charging chain and are not worn-out by unnecessary charges. These cells are also less exposed to over-charge situation thus the battery usage is much safer. The overall charge time can be reduced in the factor of N because of charging more cells in parallel and even utilize charge in lower charge current per cell, extending the life cycle of the battery. The battery manufacturer can then specify less cells within the battery structure because it can use less serial constantly connected cells that overcome the ware-out problem and this additional cells can support the parallel structure instead to provide for the needed peak current.

4. Efficient Battery Discharging

In the case of such large batteries that are comprised of many cells, that need to perform well over a long period of time, say 5 years in Li-ion car batteries, the discharging task is becoming critical for the lifetime of the battery. The Li-ion chemistry limits the charging of the cells to 2.5V minimum. Discharging the battery to lower rate will create irreversible damage to the cell and will disable the use of the hole pack. The current constant structure of the battery poses a process of discharge that involves all the battery cells at once. This process of discharging can be harmful if a certain cell is over discharged and for that reason there is a mechanism that stops the discharge of the entire pack if even only one of the cells reaches 2.5V. This mechanism disables the utilization of the full capacity of each of the cells and limits it by the weakest cell in the pack. It is well known that after only 200 cycles the battery pack will have significant cell to cell variations and this create inefficient utilization of the battery capacity.

With the systems described herein, for a certain charge interval of time, the EVProcessor™ reads the actual voltage of each cell. It then decides for the coming period of charge time which of the cells will be discharged and how many cells will be connected in serial and in parallel in order to create the best discharge current flow. Cells that reach the minimum voltage of 2.5V allowed are kept aside (i.e., electrically disconnected as described above) while other cells discharge continues. This enables the discharge of all of the cells to their minimum capacity. In this manner the full capacity of the battery can be used.

The outcome of this discharge process is that cells that finished the discharge cycle are kept out of the discharge chain and are not limiting the ability to continue the discharge of the rest of the cells. These cells are also less exposed to over-discharge situation thus the battery usage is much gentle, extending the life cycle of the battery. The battery manufacturer can then specify fewer cells within the battery structure because it can use less constantly connected cells that overcome the ware-out problem reducing the overall cost of the battery.

5. Optimized EV Motor Performance

In the case of such large battery packs that are comprised of many cells, that need to perform well over a long period of time, providing the best values of current/voltage according to the constantly changing needs of the motor is a challenging task. The current constant structure of the battery poses the manufacturer to assemble the battery pack in a structure that will have enough cells in parallel connection to support the highest current needed for needed torque performance and in the same time to assemble enough cell in serial to support that highest voltage needed to support the horse power needs. This design process is limited by the weight and cost of the battery pack and forces the manufacturer to compromise on the car performance values.

With the systems described herein, for a certain interval of time, the EVProcessor™ reads the car manufacturer engine graph that is stored in the database and the actual voltage of each cell and as well as the cell history database to review the amount of charge cycles the cell have already passed. It than decides for the coming period of time which of the cells will be used and how many cells will be connected in serial and in parallel in order to create the best structure to support the needed motor voltage and current. This way of using the cells in a flexible structure give the manufacturer a new degree of freedom in the design of the battery structure and support better motor values of torque and horse power providing a better car to the customer for the same battery cost.

The battery manufacturer can also specify fewer cells within the battery structure because it can use different cell structure to support the extreme current or voltage needs in different period of time.

This advance use of the battery power is saving a lot of energy, complexity and cost invested today into the structure of the inverter that needs to support the demanding AC needs of the motor from a fixed DC battery power. The EVProcessor™ can replace most of the functionality of the Inverter by creating the desired AC power by constantly changing the amount of serial cells connected together to create the momentarily voltage.

Other Battery Uses

Even though the primary goal of this invention is to better utilize Electric Vehicles Battery packs, battery pack system 100 can be used for different battery applications like mobile phones or laptop computers. Of course, the economy of each use-case is different but the basic practice in which we divide the battery to cells, connect them with the 3D Battery Switching Grid™ battery switching grid and employ sophisticated micro-management and control methods can be matched to every case.

The invention claimed is:

1. A switcher chip for use in interconnecting a set of energy sources, comprising:
   a main negative terminal;
   a cascading negative terminal;
   a main positive terminal;
   a cascading positive terminal;
   a plurality of energy source terminals; and
   a plurality of switches, wherein
   the switcher chip is configured such that:
   when a set of energy sources are connected to the switcher chip via the plurality of energy source terminals and a first subset of the plurality of switches are closed and the remainder of the switches are open, the set of energy sources are connected in parallel with each other and current is able to flow out the main positive terminal but is not able to flow out the cascading positive terminal,
   when a set of energy sources are connected to the switcher chip via the plurality of energy source terminals and a second subset of the plurality of switches are closed and the remainder of the switches are open, the set of energy sources are connected in series with each other and current is able to flow out the main positive terminal but is not able to flow out the cascading positive terminal,
   when a set of energy sources are connected to the switcher chip via the plurality of energy source terminals and a third subset of the plurality of switches are closed and the remainder of the switches are open, at least two of the energy sources in the set of energy sources are connected in series with each other and current is able to flow out the cascading positive terminal but is not able to flow out the main positive terminal, when a set of energy sources are connected to the switcher chip via the plurality of energy source terminals and a fourth subset of the plurality of switches are closed and the remainder of the switches are open, a subset set of energy sources are connected in parallel with each other, at least one energy source is electrically disconnected from each of the other energy sources, and current is able to flow out the main positive terminal but is not able to flow out the cascading positive terminal, and when a set of energy sources are connected to the switcher chip via the plurality of energy source terminals and a fifth subset of the plurality of switches are closed and the remainder of the switches are open, a subset set of energy sources are connected in series with each other and at least one energy source from the set is electrically disconnected from each of the other energy sources of the set.

2. The switcher chip of claim 1, further comprising:
a communication circuit comprising a transmitter and receiver, wherein
the receiver is communicatively connected to either a controller or a transmitter of an adjacent switcher chip such that the receiver is operable to receive switching commands transmitted from either the controller or the transmitter of the adjacent switcher chip.

3. The switcher chip of claim 2, further comprising:
a command decoder configured to error check commands received by the communication circuit from the controller or from another switcher chip and configured to block erroneous commands.

4. The switcher chip of claim 3, further comprising:
switching control logic connected to the command decoder and configured to convert commands received by the communication circuit from the controller into switch on-off commands.

5. The switcher chip of claim 4, further comprising:
a safety switching sequencer configured to receive the on-off commands from the switching control logic and configured to turn on or off at exact sequence and time one or more of the switches based on the received on-off commands.

6. The switcher chip of claim 1, further comprising:
a slave input terminal;
a master output terminal;
a slave communication module block;
a master communication module block;
a command decoder block;
a switching control logic block;
a safety switching sequencer block.

7. The switcher chip of claim 1, wherein the plurality of switches comprises a plurality of power metal-oxide semiconductor field effect transistors (MOSFETs).

8. A module, comprising:
a switcher chip comprising a plurality of switches, a main positive terminal, a main negative terminal, a cascading positive terminal and a cascading negative terminal; and
a set of energy sources, the set of energy sources comprising:
(i) a first energy source having a positive terminal and a negative terminal, the positive terminal being connected to a first energy source terminal of the switcher chip and the negative terminal being connected to a second energy source terminal of the switcher chip, and
(ii) a second energy source having a positive terminal and a negative terminal, the positive terminal is connected to a third energy source terminal of the switcher chip and the negative terminal is connected to a fourth energy source terminal of the switcher chip, wherein
the switcher chip is operable to:
(i) configure the switches such that (a) the energy sources are connected in series, (b) current is able to flow out of the switcher chip via the main positive terminal but is not able to flow out the switcher chip via the cascading positive terminal, and (c) current is able to flow into the switcher chip via the main negative terminal but is not able to flow into the switcher chip via the cascading negative terminal,
(ii) configure the switches such that (a) the energy sources are connected in series, (b) current is able to flow out of the switcher chip via the cascading positive terminal but is not able to flow out the switcher chip via the main positive terminal, and (c) current is able to flow into the switcher chip via the cascading negative terminal but is not able to flow into the switcher chip via the main negative terminal, and
(iii) configure the switches such that (a) the energy sources are connected in parallel, (b) current is able to flow out of the switcher chip via the main positive terminal but is not able to flow out the switcher chip via the cascading positive terminal, and (c) current is able to flow into the switcher chip via the main negative terminal but is not able to flow into the switcher chip via the cascading negative terminal.

9. The module of claim 8, wherein the switcher chip further comprises:
a communication circuit for receiving switching commands transmitted from a controller.

10. The module of claim 9, wherein the switcher chip further comprises:
a command decoder configured to error check commands received by the communication circuit from the controller or from another switcher chip and configured to block erroneous commands.

11. The module of claim 10, wherein the switcher chip further comprises:
switching control logic connected to the command decoder and configured to convert commands received by the communication circuit from the controller into switch on-off commands for switching elements within the module.

12. The module of claim 11, wherein the switcher chip further comprises:
a safety switching sequencer configured to receive the on-off commands from the switching control logic and configured to turn on or off at exact sequence and time one or more of the switches based on the received on-off commands.

13. The module of claim 8, wherein the first energy source is a battery cell.

14. The module of claim 8, wherein the switcher chip controls less than seventeen energy sources but more than three energy sources.

15. The module of claim 8, wherein the switcher chip controls more than 7 energy sources and less than 13 energy source.

16. A system comprising an energy pack, the energy pack comprising:

a first cluster of energy modules comprising a first column of energy modules and a second column of energy modules;

a first circuit for connecting the first column of energy modules in parallel with the second column of energy modules;

a second circuit for connecting the first column of energy modules in series with the second column of energy modules;

a second cluster of energy modules comprising a third column of energy modules and a fourth column of energy modules;

a third circuit for connecting the third column of energy modules in parallel with the fourth column of energy modules;

a fourth circuit for connecting the third column of energy modules in series with the fourth column of energy modules, wherein at least one of the energy modules in the first column has (i) a switch for connecting and disconnecting a main output of the energy module to the first circuit and (ii) a switch for connecting and disconnecting a cascading output of the energy module to the second circuit, at least one of the energy modules in the second column has (i) a switch for connecting and disconnecting a main output of the energy module to the first circuit and (ii) a switch for connecting and disconnecting a cascading output of the energy module to the second circuit, at least one of the energy modules in the third column has (i) a switch for connecting and disconnecting a main output of the energy module to the third circuit and (ii) a switch for connecting and disconnecting a cascading output of the energy module to the fourth circuit, and at least one of the energy modules in the fourth column has (i) a switch for connecting and disconnecting a main output of the energy module to the third circuit and (ii) a switch for connecting and disconnecting a cascading output of the energy module to the fourth circuit.

17. The pack system of claim 16, further comprising a controller for controlling the energy pack.

18. The pack system of claim 17, wherein the controller operable to:
(a) place the energy pack in a first mode of operation in which the energy pack produces a voltage V1; and
(b) place the energy pack in second mode of operation in which the energy pack produces a voltage V2, where V2>V1.

19. The pack system of claim 18, wherein V2 is greater tan or equal to n3.6V1, where n is greater than or equal to 1.

20. The pack system of claim 18, wherein at least one of the energy modules comprises:
a switcher chip comprising: a plurality of switches, a main positive terminal, a main negative terminal, a cascading positive terminal and a cascading negative terminal; and
a set of energy sources comprising (i) a first energy source having a positive terminal and a negative terminal, the positive terminal being connected to a first energy source terminal of the switcher chip and the negative terminal being connected to a second energy source terminal of the switcher chip, and (ii) a second energy source having a positive terminal and a negative terminal, the positive terminal is connected to a third energy source terminal of the switcher chip and the negative terminal is connected to a fourth energy source terminal of the switcher chip.

21. The pack system of claim 20, wherein the controller is operable to:
(i) cause the energy module to configure the switches such that (a) the energy sources are connected in series, (b) current is able to flow out of the switcher chip via the main positive terminal but is not able to flow out the switcher chip via the cascading positive terminal, and (c) current is able to flow into the switcher chip via the main negative terminal but is not able to flow into the switcher chip via the cascading negative terminal,
(ii) cause the energy module to configure the switches such that (a) the energy sources are connected in series, (b) current is able to flow out of the switcher chip via the cascading positive terminal but is not able to flow out the switcher chip via the main positive terminal, and (c) current is able to flow into the switcher chip via the cascading negative terminal but is not able to flow into the switcher chip via the main negative terminal, and
(iii) cause the energy module to configure the switches such that (a) the energy sources are connected in parallel, (b) current is able to flow out of the switcher chip via the main positive terminal but is not able to flow out the switcher chip via the cascading positive terminal, and (c) current is able to flow into the switcher chip via the main negative terminal but is not able to low into the switcher chip via the cascading negative terminal.

* * * * *